United States Patent
Rhim et al.

(10) Patent No.: US 11,511,429 B2
(45) Date of Patent: Nov. 29, 2022

(54) METHOD OF IMPROVING SAFETY OF ROBOT AND METHOD OF EVALUATING SAFETY OF ROBOT

(71) Applicant: Safetics, Inc., Seoul (KR)

(72) Inventors: Sungsoo Rhim, Seoul (KR); Heonseop Shin, Daejeon (KR); Kwang Seo, Suwon-si (KR)

(73) Assignee: SAFETICS, INC., Seoul (KR)

( * ) Notice: Subject to any disclaimer, the term of this patent is extended or adjusted under 35 U.S.C. 154(b) by 273 days.

(21) Appl. No.: 16/760,265

(22) PCT Filed: Oct. 31, 2018

(86) PCT No.: PCT/KR2018/013056
§ 371 (c)(1),
(2) Date: Apr. 29, 2020

(87) PCT Pub. No.: WO2019/088681
PCT Pub. Date: May 9, 2019

(65) Prior Publication Data
US 2021/0362338 A1    Nov. 25, 2021

(30) Foreign Application Priority Data

Oct. 31, 2017 (KR) .................. 10-2017-0143802
Oct. 31, 2017 (KR) .................. 10-2017-0143813

(51) Int. Cl.
*B25J 9/16* (2006.01)
*G05B 19/4155* (2006.01)
(Continued)

(52) U.S. Cl.
CPC ......... *B25J 9/1671* (2013.01); *B25J 9/1605* (2013.01); *B25J 9/1666* (2013.01); *B25J 9/1674* (2013.01);
(Continued)

(58) Field of Classification Search
CPC ...... B25J 9/1671; B25J 9/1605; B25J 9/1666; B25J 9/1676; B25J 9/1674; B25J 19/06;
(Continued)

(56) References Cited

U.S. PATENT DOCUMENTS

| 9,789,610 B1* | 10/2017 | Watts ............. B25J 9/1666 |
| 2005/0113971 A1* | 5/2005 | Zhang ............. B25J 9/1687 |
| | | 700/245 |

(Continued)

FOREIGN PATENT DOCUMENTS

| DE | 102016002564 A1 * | 8/2016 | ............. B25J 19/06 |
| JP | 2004-001217 A | 1/2004 | |

(Continued)

OTHER PUBLICATIONS

Bobka et al., "Simulation platform to investigate safe operation of human-robot collaboration systems", ScienceDirect, Procedia CIRP, 2016, pp. 187-192, vol. 44, https://www.researchgate.net/publication/302921884_Simulation_Platform_to_Investigate_Safe_Operation_of_Human-Robot_Collaboration_Systems (Year: 2016).*

(Continued)

*Primary Examiner* — Khoi H Tran
*Assistant Examiner* — Tanner L Cullen
(74) *Attorney, Agent, or Firm* — Sughrue Mion, PLLC

(57) ABSTRACT

A method of evaluating safety of a robot includes a step of obtaining a three-dimensional image or three-dimensional model of a test robot comprising shape information of a real robot, a step of setting a movement time and movement path of the test robot by inputting profile information comprising movement time information and movement path information of the test robot, a step of calculating a collision pressure and collision force applied to a collision object in consideration of a shape, effective mass, movement speed, and direction of an injury-causing dangerous portion of the test robot, and a step of evaluating safety of the robot by determining whether magnitudes of the calculated collision pressure and collision force fall within magnitudes of a predetermined maximum collision pressure and predetermined maximum collision force.

23 Claims, 9 Drawing Sheets

(51) Int. Cl.
*G06T 17/00* (2006.01)
*B25J 19/00* (2006.01)

(52) U.S. Cl.
CPC .......... *G05B 19/4155* (2013.01); *G06T 17/00* (2013.01); *G05B 2219/40201* (2013.01); *G05B 2219/40202* (2013.01); *G05B 2219/50391* (2013.01)

(58) Field of Classification Search
CPC ...... B25J 19/0095; B25J 19/00; B25J 13/081; B25J 13/085; B25J 13/088; G05B 19/4061; G05B 2219/40201; G05B 2219/40317; G05B 2219/39091; G05B 2219/40371; G05B 2219/40476; G05B 2219/40202; G05B 2219/50391; G05B 19/4155; G06T 17/00
See application file for complete search history.

(56) References Cited

U.S. PATENT DOCUMENTS

| | | | | |
|---|---|---|---|---|
| 2007/0268288 | A1* | 11/2007 | Duriez | G06T 19/00 345/419 |
| 2015/0231786 | A1* | 8/2015 | Doi | B25J 9/1605 700/245 |
| 2016/0026751 | A1* | 1/2016 | Walther | G06F 30/17 703/13 |
| 2016/0167231 | A1* | 6/2016 | Nakayama | B25J 9/1694 700/255 |
| 2017/0182663 | A1 | 6/2017 | Feldmann et al. | |

FOREIGN PATENT DOCUMENTS

| | | | |
|---|---|---|---|
| JP | 4495252 | B2 | 6/2010 |
| JP | 5983170 | B2 | 8/2016 |
| KR | 10-2007-0121574 | A | 12/2007 |
| KR | 10-2016-0012934 | A | 2/2016 |
| WO | 2014/102018 | A1 | 7/2014 |
| WO | WO-2018051151 | A1 * | 3/2018 ............... B25J 9/16 |

OTHER PUBLICATIONS

Jun Seok Choi, et al., "Prediction of Contact Force and Pressure Considering Impactor Shape for Robot Safety Evaluation", Proceedings of Korean Society for Precision Engineering Conference, Dec. 2015, pp. 174-175.

Paul Bobka, et al., "Simulation platform to investigate safe operation of human-robot collaboration systems", ScienceDirect, Procedia CIRP, 2016, pp. 187-192, vol. 44.

Office Action issued from Korean Patent Application No. 10-2017-0143813 dated Oct. 29, 2018.

Notice of Allowance issued from Korean Patent Application No. 10-2017-0143813 dated Apr. 29, 2019.

Notice of Allowance issued from Korean Patent Application No. 10-2017-0143802 dated Jul. 11, 2019.

International Search Report for PCT/KR2018/013056 dated Feb. 1, 2019 (PCT/ISA/210).

* cited by examiner

METHOD OF IMPROVING SAFETY OF ROBOT AND METHOD OF EVALUATING SAFETY OF ROBOT

CROSS-REFERENCE TO RELATED APPLICATIONS

This application is a National Stage Entry of PCT International Application No. PCT/KR2018/013056, which was filed on Oct. 31, 2018, and which claims priority to Korean Patent Application No. 10-2017-0143802, filed on Oct. 31, 2017, and Korean Patent Application No. 10-2017-0143813, filed on Oct. 31, 2017, in the Korean Intellectual Property Office, the disclosures of each of which are incorporated herein by reference.

TECHNICAL FIELD

The present invention relates to a method of improving the safety of a robot and a method of evaluating the safety of a robot. More specifically, according to the method of improving the safety of a robot, when a robot and an operator collide in a specific workspace, depending on the shape of each part of the robot, a collision pressure and collision force applied to an operator are calculated through simulation, and the speed and posture of the robot are controlled so that the calculated values satisfy the standards of the International Organization for Standardization (ISO). In addition, according to the method of evaluating the safety of a robot, it is determined whether the calculated values are within the standards of the International Organization for Standardization (ISO), thereby improving the accuracy of safety evaluation.

BACKGROUND ART

In recent years, with realization of high-performance robots, various efforts have been made to maximize convenience of operation and to secure safety by preventing collision between a robot and an operator during operation of the robot.

Since a person may work in a working space in which a robot is installed, collision accidents may frequently occur during work. Accordingly, precision of motion (1st requirement) and safety of motion (2nd requirement) are essential in the field of robotics. In the case of the first requirement, as technology for precisely controlling a motor has been developed, precision of motion is now being realized to a certain level. However, in the case of the second requirement, compared to precision of motion, technical completeness is very poor.

In particular, in recent years, as the term "safety" has emerged as a key topic in robot systems, various studies have been conducted to increase the safety of robots.

As a method commonly used to secure the safety of a robot, there is a method of reducing the speed of a robot to a certain speed or less. However, this method is a method of securing the safety of a robot by significantly reducing the speed of the robot, rather than a method of evaluating the adequacy of the speed of a robot and controlling the speed of the robot based on the evaluated adequacy. Accordingly, when the conventional method is used, safety may be increased, but productivity may be significantly reduced, resulting in less efficiency.

To solve this problem and increase productivity, a method of installing a fence around a robot and operating the robot only when an operator is not within the fence has been proposed. However, a method of ensuring safety when a robot and a person are in the same space as in the case of using a cooperative robot, a service robot, or the like has yet to be developed. Accordingly, there is demand for a system capable of preventing an operator from being injured by a robot while allowing the operator and the robot to work in the same space.

In addition, according to conventional methods of evaluating the safety of robots, a separate device is installed in a test robot to measure collision pressure, collision force, movement speed, or the like. Accordingly, there is a problem that evaluation cost increases.

In addition, when evaluating safety, a test robot repeatedly stops and operates more than necessary, thereby reducing work efficiency and placing strain on the test robot.

To solve this problem, a method of measuring a collision force applied to the body according to movement of a test robot has been developed. However, according to this method, collision force is measured by applying a constant pressure regardless of the shape of the collision portion of a test robot. Accordingly, there is a problem that the accuracy of safety evaluation is lowered.

DISCLOSURE

Technical Problem

Therefore, the present invention has been made in view of the above problems, and it is one object of the present invention to provide a method of improving the safety of a robot. According to the method, in consideration of the shape of a test robot, a collision pressure and collision force applied to an operator are calculated depending on the movement speed and movement path of each part of the test robot, and the speed and posture of the test robot are controlled so that the calculated values satisfy the standards of the International Organization for Standardization (ISO).

It is another object of the present invention to provide a method of evaluating the safety of a robot. According to the method, in consideration of the shape of a test robot, a collision pressure and collision force applied to an operator are calculated depending on the movement speed and movement path of each part of the test robot, and it is determined whether the calculated values are within the standards of the International Organization for Standardization (ISO), thereby improving the accuracy of safety evaluation.

Technical Solution

In accordance with one aspect of the present invention, provided is a method of improving the safety of a robot, the method including a step of obtaining the three-dimensional shape of a test robot; a step of setting the movement time and movement path of the test robot; a step of evaluating the safety of the robot every predetermined time; a step of calculating a maximum speed of the test robot at which the magnitudes of a collision pressure and collision force fall within predetermined allowable safety reference values; and a step of resetting the movement time and movement path of the test robot. In the step of obtaining the three-dimensional shape of a test robot, the three-dimensional image or three-dimensional model of the test robot including the shape information of a real robot is obtained. In the step of setting the movement time and movement path of the test robot, by inputting profile information including the movement time information and movement path information of the test robot, the movement time and movement path of the test robot are set. In the step of evaluating the safety of the robot every predetermined time, in consideration of the shape, effective mass, movement speed, and direction of the injury-causing dangerous portion of the test robot, a collision pressure and collision force applied to a collision object are obtained every predetermined time, and the safety of the robot is evaluated by determining whether the magnitudes of the collision pressure and collision force obtained every predetermined time fall within the magnitudes of a predetermined maximum collision pressure and predetermined maximum collision force. In the step of calculating a maximum speed of the test robot at which the magnitudes of a collision pressure and collision force fall within predetermined allowable safety reference values, when the magnitudes of the collision pressure and collision force are greater than the magnitudes of the predetermined maximum collision pressure and predetermined maximum collision force, a maximum speed at which the magnitudes of the collision pressure and collision force satisfy the magnitudes of the maximum collision pressure and maximum collision force is calculated. In the step of resetting the movement time and movement path of the test robot, the movement time and movement path of the test robot are reset by modifying the profile information so that the test robot moves at the calculated maximum speed.

According to one embodiment, the test robot may be a three-dimensional model formed through a three-dimensional image or three-dimensional measurement sensor formed by inputting the shape information of the robot into a simulation program. Here, the simulation program may be a computer-aided engineering (CAE) program.

According to one embodiment, the magnitudes of the maximum collision pressure and maximum collision force may be determined in accordance with the standards of the International Organization for Standardization (ISO).

According to one embodiment, the test robot may be a manipulator having at least one degree of freedom.

According to one embodiment, the test robot may include two or more linkers connected through a joint and an end-effector connected to one of the linkers. The injury-causing dangerous portion may include one or more selected from the linkers and the end-effector.

According to one embodiment, the step of evaluating the safety of the robot may further include a step of adjusting the joint angle of the test robot to change the postures of the linkers and end-effector, a step of obtaining, every predetermined time, a minimum collision pressure and minimum collision force applied to a collision object depending on changes in the postures, and a step of moving the test robot while changing, every predetermined time, the joint angle at an angle corresponding to the minimum collision pressure and minimum collision force.

According to one embodiment, the step of evaluating the safety of the robot may further include a step of calculating a contact pressure applied to a collision object depending on the shape of each portion of the test robot, and setting at least one injury-causing dangerous portion in the test robot based on the calculated contact pressure value.

In accordance with another aspect of the present invention, provided is a method of improving the safety of a robot, the method including a step of obtaining the three-dimensional shape of a test manipulator; a step of setting the movement time and movement path of the test manipulator; a step of setting an injury-causing dangerous portion in the test manipulator; a step of evaluating the safety of the test manipulator every predetermined time; a step of calculating a maximum speed of the test manipulator at which the magnitudes of a collision pressure and collision force fall within predetermined allowable safety reference values; and a step of resetting the movement time and movement path of the test manipulator. In the step of obtaining the three-dimensional shape of a test manipulator, the three-dimensional image or three-dimensional model of the test manipulator including the shape information of a real manipulator and having at least one degree of freedom is obtained. In the step of setting the movement time and movement path of the test manipulator, the movement time and movement path of the test manipulator are set by inputting profile information including the movement time information and movement path information of the test manipulator. In the step of setting an injury-causing dangerous portion in the test manipulator, a contact pressure applied to a collision object depending on the shape of each portion of the test manipulator is calculated, and at least one injury-causing dangerous portion is set in the test manipulator based on the calculated contact pressure value. In the step of evaluating the safety of the test manipulator every predetermined time, a collision pressure and collision force applied to the collision object are obtained every predetermined time in consideration of the effective mass, movement speed, and direction of the injury-causing dangerous portion of the test manipulator, and the safety of the manipulator is evaluated by determining whether the magnitudes of the collision pressure and collision force fall within the magnitudes of a predetermined maximum collision pressure and predetermined maximum collision force. In the step of calculating a maximum speed of the test manipulator at which the magnitudes of a collision pressure and collision force fall within predetermined allowable safety reference values, when the magnitudes of the collision pressure and collision force are greater than the magnitudes of the predetermined maximum collision pressure and predetermined maximum collision force, a maximum speed for each movement direction at which the magnitudes of the collision pressure and collision force fall within the magnitudes of the maximum collision pressure and maximum collision force is calculated. In the step of resetting the movement time and movement path of the test manipulator, the movement time and movement path of the test manipulator are reset by modifying the profile information so that the test manipulator moves at the calculated maximum speed.

According to one embodiment, the test manipulator may be a three-dimensional model formed through a three-dimensional image or three-dimensional measurement sensor formed by inputting the shape information of the manipulator into a simulation program. Here, the simulation program may be a computer-aided engineering (CAE) program.

According to one embodiment, the magnitudes of the maximum collision pressure and maximum collision force may be determined in accordance with the standards of the International Organization for Standardization (ISO).

According to one embodiment, the test manipulator may include two or more linkers connected through a joint and an end-effector connected to one of the linkers. The injury-causing dangerous portion may include one or more selected from the linkers and the end-effector.

According to one embodiment, the step of evaluating the safety of the manipulator may further include a step of adjusting the joint angle of the test manipulator to change the postures of the linkers and end-effector, a step of obtaining, every predetermined time, a minimum collision pressure and minimum collision force applied to a collision object depending on changes in the postures, and a step of moving the test manipulator while changing, every predetermined time, the joint angle at an angle corresponding to the minimum collision pressure and minimum collision force.

In accordance with still another aspect of the present invention, provided is a method of evaluating the safety of a robot, the method including a step of obtaining the three-dimensional shape of a test robot; a step of setting the movement time and movement path of the test robot; a step of calculating a collision pressure and collision force applied to a collision object by the test robot; and a step of evaluating the safety of the robot. In the step of obtaining the three-dimensional shape of a test robot, the three-dimensional image or three-dimensional model of the test robot including the shape information of a real robot is obtained. In the step of setting the movement time and movement path of the test robot, the movement time and movement path of the test robot are set by inputting profile information including the movement time information and movement path information of the test robot. In the step of calculating a collision pressure and collision force applied to a collision object by the test robot, the collision pressure and collision force applied to the collision object are calculated in consideration of the shape, effective mass, movement speed, and direction of the injury-causing dangerous portion of the test robot. In the step of evaluating the safety of the robot, the safety of the robot is evaluated by determining whether the magnitudes of the calculated collision pressure and collision force fall within the magnitudes of a predetermined maximum collision pressure and predetermined maximum collision force.

According to one embodiment, the test robot may be a three-dimensional model formed through a three-dimensional image or three-dimensional measurement sensor formed by inputting the shape information of the robot into a simulation program. Here, the simulation program may be a computer-aided engineering (CAE) program.

According to one embodiment, when the magnitudes of the collision pressure and collision force are greater than or equal to the magnitudes of the maximum collision pressure and maximum collision force, the speed of the test robot may be controlled so that the magnitudes of the collision pressure and collision force applied to the collision object are less than the magnitudes of the maximum collision pressure and maximum collision force.

According to one embodiment, the magnitudes of the maximum collision pressure and maximum collision force may be determined in accordance with the standards of the International Organization for Standardization (ISO).

According to one embodiment, the test robot may be a manipulator having at least one degree of freedom.

According to one embodiment, the test robot may include two or more linkers connected through a joint and an end-effector connected to one of the linkers. The injury-causing dangerous portion may include one or more selected from the linkers and the end-effector.

According to one embodiment, the step of calculating a collision pressure and collision force applied to a collision object by the test robot may further include a step of adjusting the angle of the joint of the test robot to change the postures of the linkers and end-effector, and calculating a collision pressure and collision force applied to the collision object by the injury-causing dangerous portion of the test robot depending on changes in the postures.

According to one embodiment, the step of calculating a collision pressure and collision force applied to a collision object by the test robot may further include a step of calculating a contact pressure applied to the collision object depending on the area of each portion of the test robot, and setting at least one injury-causing dangerous portion in the test robot based on the calculated contact pressure value.

According to one embodiment, in the step of calculating a collision pressure and collision force applied to a collision object by the test robot, a collision pressure and collision force applied to the collision object for a predetermined time unit may be calculated.

In accordance with yet another aspect of the present invention, provided is a method of evaluating the safety of a robot, the method including a step of obtaining the three-dimensional shape of a test manipulator; a step of setting the movement time and movement path of the test manipulator; a step of setting an injury-causing dangerous portion in the test manipulator; a step of calculating a collision pressure and collision force applied to a collision object by the test manipulator; and a step of evaluating the safety of the manipulator. In the step of obtaining the three-dimensional shape of a test manipulator, the three-dimensional image or three-dimensional model of the test manipulator including the shape information of a real manipulator and having at least one degree of freedom is obtained. In the step of setting the movement time and movement path of the test manipulator, the movement time and movement path of the test manipulator are set by inputting profile information including the movement time information and movement path information of the test manipulator. In the step of setting an injury-causing dangerous portion in the test manipulator, a contact pressure applied to a collision object depending on the shape of each portion of the test manipulator is calculated, and at least one injury-causing dangerous portion is set in the test manipulator based on the calculated contact pressure value. In the step of calculating a collision pressure and collision force applied to a collision object by the test manipulator, a collision pressure and collision force applied to the collision object are calculated in consideration of the effective mass, movement speed, and direction of the injury-causing dangerous portion of the test manipulator. In the step of evaluating the safety of the manipulator, the safety of the manipulator is evaluated by determining whether the magnitudes of the calculated collision pressure and collision force fall within the magnitudes of a predetermined maximum collision pressure and predetermined maximum collision force.

According to one embodiment, in the step of calculating a collision pressure and collision force applied to a collision object by the test manipulator, a collision pressure and collision force applied to the collision object for a predetermined time unit may be calculated.

According to one embodiment, when the magnitudes of the collision pressure and collision force are greater than or equal to the magnitudes of the maximum collision pressure and maximum collision force, the speed of the manipulator may be controlled so that the magnitudes of the collision pressure and collision force applied to the collision object are less than the magnitudes of the maximum collision pressure and maximum collision force.

According to one embodiment, the magnitudes of the maximum collision pressure and maximum collision force may be determined in accordance with the standards of the International Organization for Standardization (ISO).

According to one embodiment, the test manipulator may include two or more linkers connected through a joint and an end-effector connected to one of the linkers. The injury-causing dangerous portion may include one or more selected from the linkers and the end-effector.

According to one embodiment, the step of calculating a collision pressure and collision force applied to a collision object by the test manipulator may further include a step of adjusting the angle of the joint of the test manipulator to change the postures of the linkers and end-effector, and calculating a collision pressure and collision force applied to the collision object by the injury-causing dangerous portion of the test manipulator depending on changes in the postures.

Advantageous Effects

According to the present invention, the magnitudes of a collision pressure and collision force generated by collision between a robot and an operator are obtained through simulation, and the speed of a robot is controlled or the posture of the robot is changed so that the obtained collision pressure and collision force satisfy the standards of the International Organization for Standardization (ISO). Thereby, productivity can be maximized while securing operator safety.

The test robot is formed of a three-dimensional model robot or three-dimensional image robot having a shape and driving motion similar to those of a real robot. In addition, in consideration of a three-dimensional shape, a contact pressure applied to a collision object is calculated depending on the shape of each portion of the robot to select an injury-causing dangerous portion, and a collision pressure and collision force applied to the collision object by the selected injury-causing dangerous portion are calculated. Accordingly, a collision pressure and collision force corresponding to the shape of the robot can be obtained. When a contact pressure applied to the collision object depending on the shape of each part of the test robot is calculated, and an injury-causing dangerous portion is selected based on the calculated value, a collision pressure and collision force corresponding to the shape of the collision portion of the test robot can be obtained, thereby improving accuracy.

In addition, when the magnitudes of a collision pressure and collision force applied to a collision object do not satisfy the standards for safety evaluation of a test robot, the speed of the robot can be controlled so that the magnitudes of the collision pressure and collision force satisfy the standards for safety evaluation, thereby improving the safety of the robot.

In addition, the magnitudes of a minimum collision pressure and minimum collision force applied to a collision object depending on changes in the posture of the test robot are calculated and stored, and then, based on the calculated values, the posture of the test robot is controlled every predetermined time. Accordingly, even when the test robot moves along the same movement path at the same movement speed, a posture that minimizes impact on a collision object can be implemented.

In addition, according to the present invention, the magnitudes of a collision pressure and collision force applied to a collision object by a test robot can be obtained through simulation using a computer program consisting of a computer-aided engineering (CAE) program and the like, or the collision pressure and collision force can be calculated in real time by applying a calculation algorithm to a test robot system. Thus, the safety of the test robot can be evaluated in real time. In addition, there is no need for separate devices to measure the collision pressure, collision force, and movement speed of the test robot. Thus, safety evaluation can be performed at low cost.

In addition, a contact pressure applied to a collision object depending on the shape of each portion of a test robot can be calculated, and an injury-causing dangerous portion can be selected. A collision pressure and collision force applied to the collision object by the selected injury-causing dangerous portion can be calculated.

In addition, since a collision pressure and collision force depending on the postures of a test robot can be obtained, a posture that minimizes impact on a collision object can be implemented. Accordingly, when the test robot moves while taking the implemented posture, the test robot can move at the maximum speed without a collision pressure exceeding the maximum pressure.

BEST MODE

Figure 1:
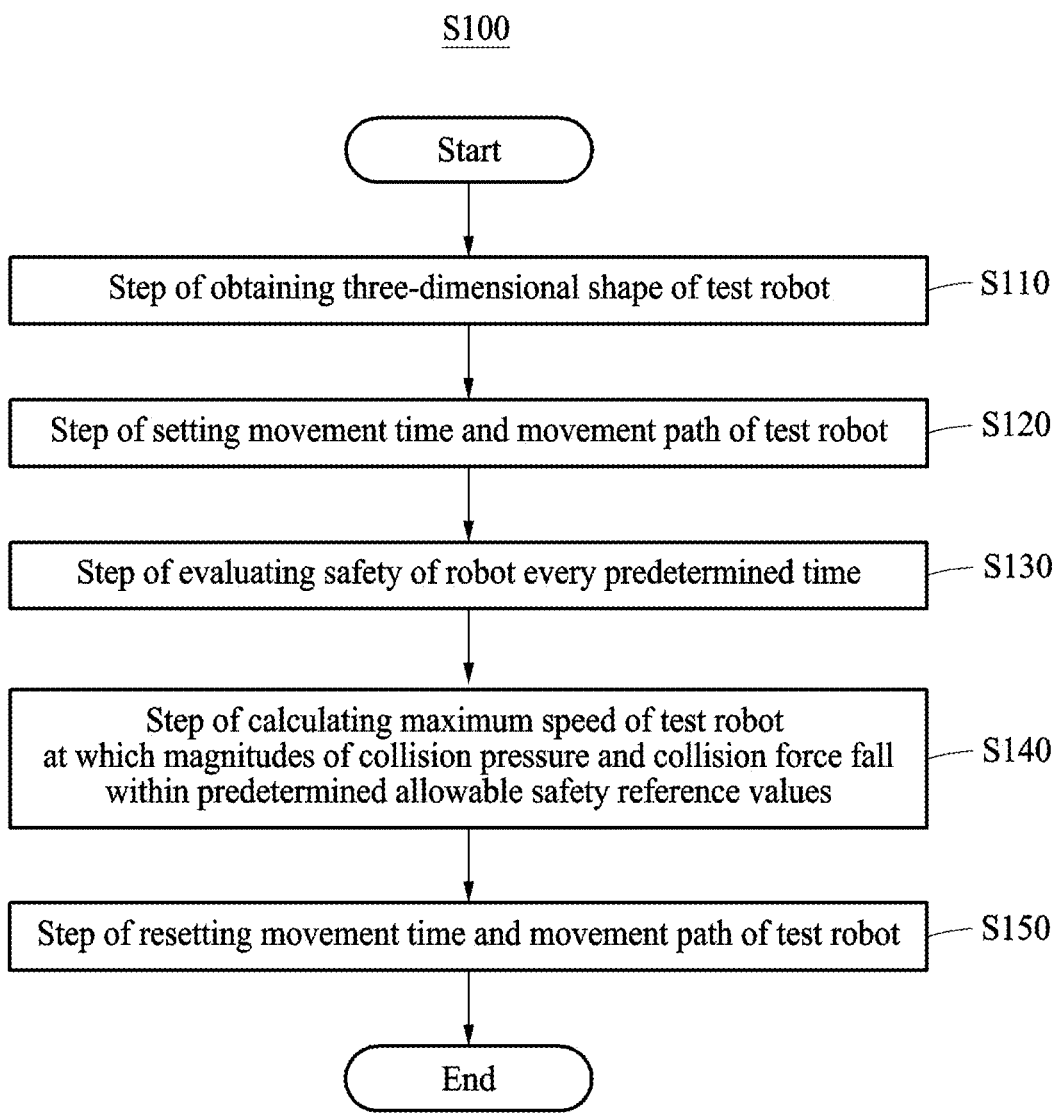
FIG. 1 is a flowchart for explaining a method of improving the safety of a robot according to one embodiment of the present invention.

Hereinafter, a method of improving the safety of a robot and a method of evaluating the safety of a robot according to preferred embodiments will be described with reference to the accompanying drawings. In this specification, the same or similar elements are designated by the same reference numerals, and repetitive descriptions and detailed descriptions of well-known functions and configurations that may unnecessarily obscure the subject matter of the invention are omitted. Embodiments of the invention are provided to more fully describe the invention to those skilled in the art. Accordingly, the shape and size of elements in the drawings may be exaggerated for clear description.

Figure 2:
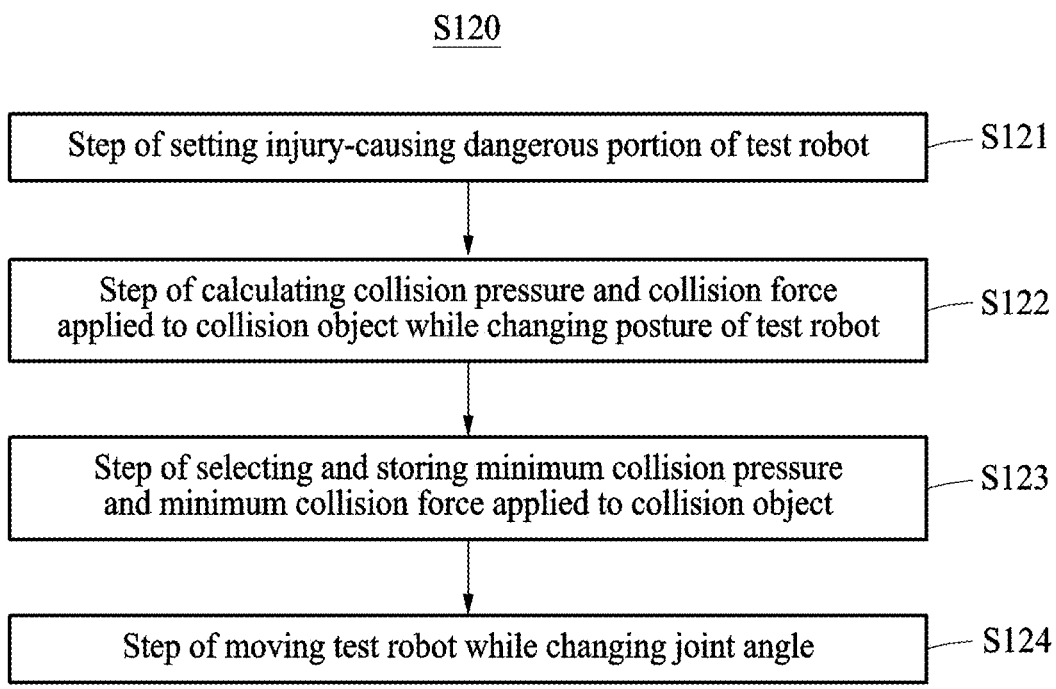
FIG. 2 is a flowchart for explaining the step of setting the movement time and movement path of a test robot shown in FIG. 1.
Figure 3:
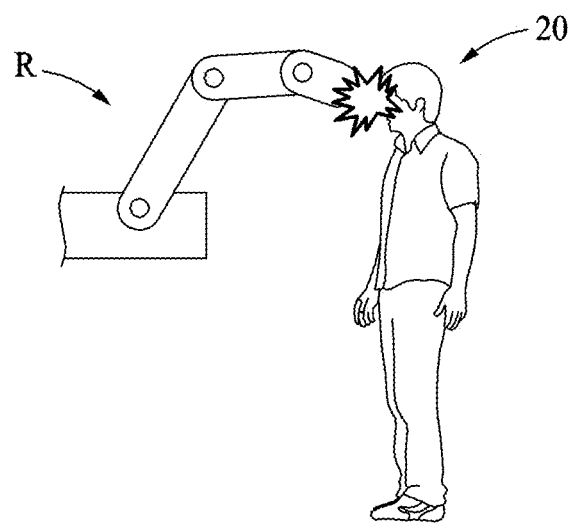
FIG. 3 schematically illustrates a situation in which a real robot collides with a collision object.
Figure 4:
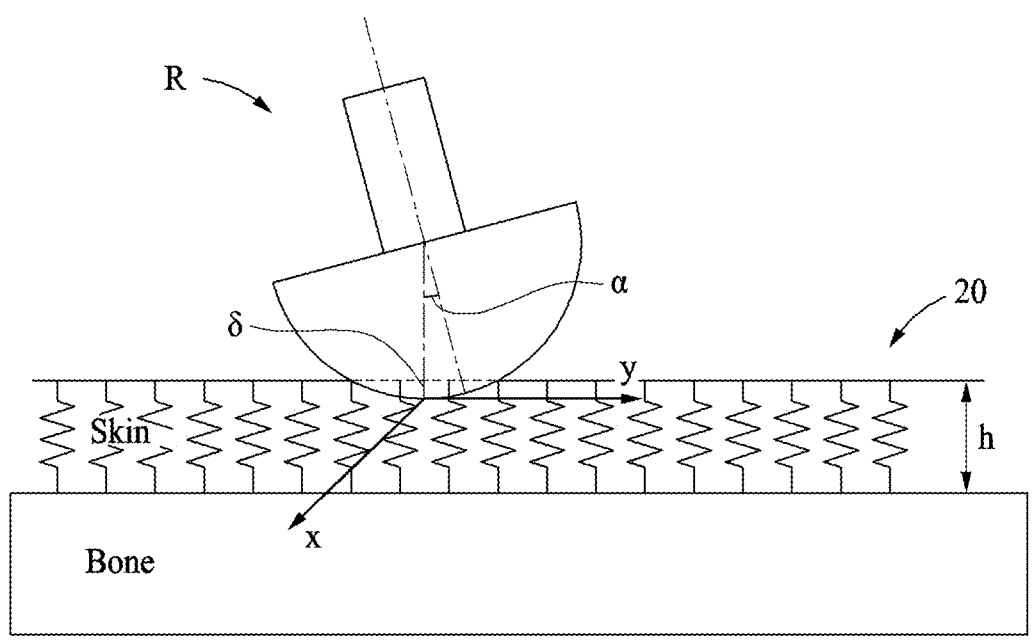
FIG. 4 illustrates changes occurring on the surface of a collision object colliding with a real robot.
Figure 5:
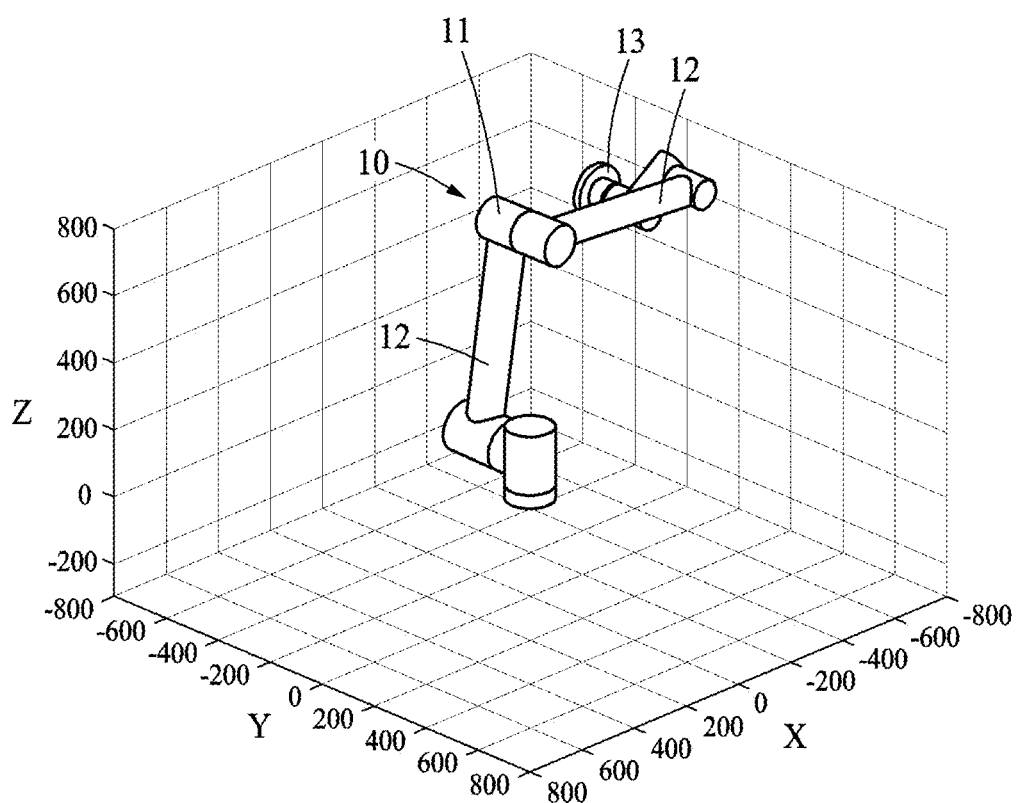
FIG. 5 shows the three-dimensional shape of a test robot.

FIG. 1 is a flowchart for explaining a method of improving the safety of a robot according to one embodiment of the present invention, and FIG. 2 is a flowchart for explaining the step of setting the movement time and movement path of a test robot shown in FIG. 1. FIG. 3 schematically illustrates a situation in which a real robot collides with a collision object, and FIG. 4 illustrates changes occurring on the surface of a collision object colliding with a real robot according to FIG. 3. FIG. 5 shows the three-dimensional shape of a test robot according to FIG. 1.

As shown in FIGS. 1 to 5, method S100 of improving the safety of a robot includes step S110 of obtaining the three-dimensional shape of a test robot, step S120 of setting the movement time and movement path of the test robot, step S130 of evaluating the safety of the robot every predetermined time, step S140 of calculating the maximum speed of the test robot at which the magnitudes of a collision pressure and collision force fall within predetermined allowable safety reference values, and step S150 of resetting the movement time and movement path of the test robot.

In step S110 of obtaining the three-dimensional shape of a test robot, the three-dimensional image or three-dimensional model of a test robot 10 including the shape information of a real robot R is obtained. Specifically, the test robot 10 may be formed of a three-dimensional model formed through a three-dimensional image or three-dimensional measurement sensor formed by inputting the shape information of the real robot R into a simulation program. That is, the test robot 10 may be a three-dimensional image formed by inputting the shape information of the real robot R into a simulation program such as a computer-aided engineering (CAE) program, or may be formed of a three-dimensional model that is implemented through a three-dimensional measurement sensor and that is driven and controlled in the same manner as the real robot R.

The type of the 3D modeled robot R is not limited, but the robot R may be a collaborative robot that jointly processes work in a certain work space. The collaborative robot may be a manipulator having a mechanical hand at the tip thereof to grip and transport a specific object or perform a specific task. In addition, the test robot 10 may be configured to have a degree of freedom capable of moving in at least one of the X-axis direction, the Y-axis direction, the Z-axis direction, the pitch direction, the yaw direction, and the roll direction. That is, the test robot 10 may be a manipulator having at least one degree of freedom.

Specifically, the test robot 10 may be a manipulator including two or more linkers 12 connected through a joint 11 and an end-effector 13 connected to one of the linkers 12. Here, the end-effector may be a part, e.g., the mechanical hand of a manipulator, directly acting on a work object when the test robot 10 operates.

In step S120 of setting the movement time and movement path of the test robot, the movement time and movement path of the test robot 10 are set by inputting profile information including the movement time information and movement path information of the test robot 10. For example, when the test robot 10 is a three-dimensional image, the movement time and movement path of the test robot 10 are set by inputting profile information including movement time information and movement path information into a simulation program. When the test robot 10 is a three-dimensional model, the movement time and movement path of the test robot 10 are set by inputting profile information including movement time information and movement path information into the control system of the test robot 10. Here, a method of controlling the driving of the test robot 10 through a simulation program and the control system of a robot is already known, and thus description thereof will be omitted.

In step S130 of evaluating the safety of the robot every predetermined time, in consideration of the shape, effective mass, movement speed, and direction of the injury-causing dangerous portion of the test robot 10, a collision pressure (P) and collision force ($F_C$) applied to a collision object 20 are obtained every predetermined time, and the safety of the robot R is evaluated by determining whether the magnitudes of the collision pressure and collision force obtained every predetermined time fall within the magnitudes of a predetermined maximum collision pressure ($P_{MAX}$) and maximum collision force ($F_{MAX}$).

In this case, the magnitudes of the predetermined maximum collision pressure ($P_{MAX}$) and predetermined maximum collision force ($F_{MAX}$) may be determined in accordance with the standards of the International Organization for Standardization (ISO). In the International Organization for Standardization (ISO), the maximum permissible pressure and maximum permissible force for each part of the human body are specified. Based thereon, when the magnitudes of the maximum collision pressure ($P_{MAX}$) and maximum collision force ($F_{MAX}$) are set, the safety of the robot R may be further improved.

The collision pressure (P) and collision force ($F_C$) applied to the collision object 20 are obtained every predetermined time unit. Thereby, the amount of data for calculating the collision pressure (P) and collision force ($F_C$) may be reduced to increase the speed of calculation, and overload may be prevented. Here, the predetermined time unit may vary depending on the shape of the test robot 10. That is, as the complexity of the shape of the test robot 10 increases, the predetermined time unit may be shortened.

Specifically, the collision force ($F_C$) applied to the collision object 20 may be implemented through Equation 1 below. Here, the collision object 20 may be a person, an effective mass ($M_i$) for the collision portion of the test robot may be calculated based on kinematics, and an effective mass ($M_h$) for the collision portion of the collision object may be determined in advance by user input. The displacement of the collision portion ($y_i$) of the test robot and the displacement of the collision portion ($y_h$) of the collision object may be obtained through the CAE system.

$$\begin{bmatrix} M_i & 0 \\ 0 & M_h \end{bmatrix} \begin{Bmatrix} \ddot{y}_i \\ \ddot{y}_h \end{Bmatrix} = \begin{Bmatrix} -F_c \\ F_c \end{Bmatrix} \qquad \text{[Equation 1]}$$

$M_i$: Effective mass for collision portion of test robot
$M_h$: Effective mass for collision portion of collision object
$F_C$: Collision force
$y_i$: Displacement of collision portion of test robot
$y_h$: Displacement of collision portion of collision object In addition, the collision pressure (P) applied to the collision object 20 may be implemented through Equation 2 below. Here, the skin elasticity (K) and skin thickness (h) of the collision object may be input by a user through the CAE system and stored in advance.

$$F_c = \int P dA = \int \int K(\delta) \frac{\delta(x, y, \alpha)}{h} dx dy \qquad \text{[Equation 2]}$$

$$\delta = y_i - y_h$$

δ: Degree of deformation of skin of collision object
α: Collision angle between test robot and collision object
$F_C$: Collision force; p: Collision pressure
K: Skin elasticity of collision object; h: Skin thickness of collision object
x, y: Coordinates of collision surface Step S120 of setting the movement time and movement path of the test robot may further include step S121 of setting the injury-causing dangerous portion of a test robot, step S122 of calculating a collision pressure and collision force applied to a collision object while changing the posture of the test robot, step S123 of selecting and storing a minimum collision pressure and minimum collision force applied to the collision object, and step S124 of moving the test robot while changing a joint angle.

In step S121 of setting the injury-causing dangerous portion of a test robot, a contact pressure applied to the collision object 20 depending on the shape of each portion of the test robot 10 is calculated, and at least one injury-causing dangerous portion is set in the test robot 10 based on the calculated contact pressure value.

For example, when the test robot 10 is formed in a cylindrical shape, the circumferential surface, upper surface, lower surface, upper edge, and lower edge of the test robot 10 may be set as the injury-causing dangerous portion. In addition, a contact pressure applied to the collision object 20 depending on the shape of each portion is calculated. Here, the contact pressure may be calculated using an equation of P=F/A (P: pressure, F: force, A: area).

When a contact pressure for each portion of the test robot 10 is calculated through this process, a portion having the greatest contact pressure value or portions having a contact pressure value exceeding a preset value may be selected as the injury-causing dangerous portion.

In addition, a user may select one or more injury-causing dangerous portions in the test robot 10. Specifically, the injury-causing dangerous portion of the test robot 10 may include one or more selected from the linkers 12 and the end-effector 13. When the injury-causing dangerous portion of the test robot 10 is set in advance by a user, step S121 of setting the injury-causing dangerous portion of a test robot may be omitted.

In step S122 of calculating a collision pressure and collision force applied to a collision object while changing the posture of the test robot, the postures of the linkers 12 and the end-effector 13 are changed by adjusting the joint angle of the test robot 10, and the collision pressure (P) and collision force ($F_C$) applied to the collision object 20 by the injury-causing dangerous portion depending on changes in the postures are calculated.

The reason for calculating the collision pressure (P) and collision force ($F_C$) applied to the collision object 20 while changing the posture of the test robot 10 is that a distance and contact portion between the collision object 20 and the test robot 10 vary depending on changes in the postures of the linkers 12 and the end-effector 13, and as a result, the magnitudes of the collision pressure (P) and collision force ($F_C$) applied to the collision object 20 vary.

In step S123 of selecting and storing a minimum collision pressure and minimum collision force applied to the collision object, the smallest value of collision pressure (P) values obtained in the previous step (step S122) and the smallest value of collision force ($F_C$) values obtained in the previous step (step S122) (hereinafter referred to as "minimum collision pressure ($P_{MIN}$)" and "minimum collision force ($F_{MIN}$)", respectively) are selected and stored. In this case, the obtained minimum collision pressure ($P_{MIN}$) and minimum collision force ($F_{MIN}$) may be selected and stored every predetermined time.

In step S124 of moving the test robot while changing a joint angle, the test robot 10 is moved while the angle of the joint 11 is changed every predetermined time at an angle corresponding to the minimum collision pressure ($P_{MIN}$) and minimum collision force ($F_{MIN}$).

As described above, when the magnitudes of the minimum collision pressure ($P_{MIN}$) and minimum collision force ($F_{MIN}$) applied to the collision object 20 depending on change in the posture of the test robot 10 are obtained and stored, and based on the obtained values, the posture of the test robot 10 is controlled every predetermined time, a posture that minimizes impact on the collision object 20 may be implemented even when the test robot 10 moves along the same movement path at the same movement speed.

In step S140 of calculating the maximum speed of the test robot at which the magnitudes of a collision pressure and collision force fall within predetermined allowable safety reference values, when the magnitudes of the collision pressure (P) and collision force ($F_C$) are greater than the magnitudes of the predetermined maximum collision pressure ($P_{MAX}$) and predetermined maximum collision force ($F_{MAX}$), a maximum speed at which the magnitudes of the collision pressure (P) and collision force ($F_C$) satisfy the magnitudes of the maximum collision pressure ($P_{MAX}$) and maximum collision force ($F_{MAX}$) is calculated. That is, when the safety of the robot R is not secured, a maximum speed is calculated so that the magnitudes of the collision pressure (P) and collision force ($F_C$) fall within the magnitudes of the maximum collision pressure ($P_{MAX}$) and maximum collision force ($F_{MAX}$).

In step S150 of resetting the movement time and movement path of the test robot, the movement time and movement path of the test robot 10 are reset by modifying profile information so that the test robot 10 moves at the maximum speed calculated in the previous step (S140).

Force applied to the collision object 20 varies depending on the speed of the test robot 10. That is, when movement speed is reduced, force applied to the collision object 20 is reduced. As a result, pressure is also reduced. Accordingly, when profile information is modified so that the test robot 10 moves at the maximum speed calculated in the previous step (S140), the test robot 10 that does not injure a person while moving at the maximum speed may be implemented.

As described above, in the method of improving the safety of a robot, the magnitudes of a collision pressure and collision force applied to a collision object by a test robot may be obtained through simulation. In addition, the test robot is formed of a three-dimensional model robot or three-dimensional image robot having a shape and driving motion similar to those of a real robot. Accordingly, there is no need for separate devices to measure the collision pressure, collision force, and movement speed of a real robot. Thus, safety evaluation may be performed at low cost.

In addition, a contact pressure applied to a collision object is calculated depending on the shape of each portion of a test robot, an injury-causing dangerous portion is selected, and a collision pressure and collision force applied to the collision object by the selected injury-causing dangerous portion are calculated. Accordingly, a collision pressure and collision force corresponding to the shape of the test robot may be obtained. That is, conventionally, regardless of the shape of a robot, a contact pressure is constantly applied to calculate a collision pressure and collision force applied to a collision object. Thus, the accuracy of the calculated values is low. However, as described in the present invention, when a contact pressure applied to a collision object is calculated depending on the shape of each part of a test robot, and an injury-causing dangerous portion is selected based on the calculated value, a collision pressure and collision force corresponding to the shape of the collision portion of the test robot may be obtained, thereby improving accuracy.

In addition, when the magnitudes of a collision pressure and collision force applied to a collision object do not satisfy the standards for safety evaluation of a test robot, the posture of the test robot is controlled every predetermined time so that the magnitudes of the collision pressure and collision force satisfy the standards for safety evaluation, thereby improving the safety of the robot.

In addition, when the magnitudes of a collision pressure and collision force applied to a collision object do not satisfy the standards for safety evaluation of a test robot, the speed of the test robot is controlled so that the magnitudes of the collision pressure and collision force satisfy the standards for safety evaluation. Accordingly, the robot may move along the same movement path at the maximum speed while improving the safety of the robot.

Figure 6:
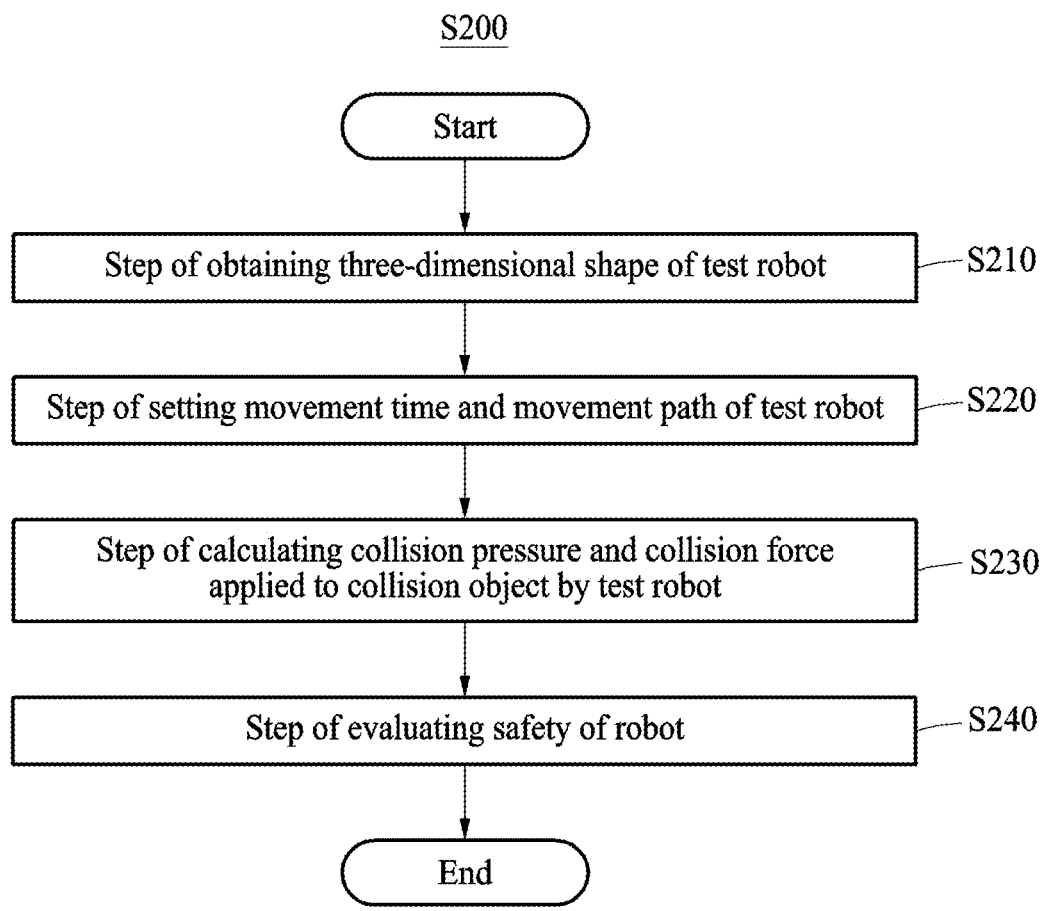
FIG. 6 is a flowchart for explaining a method of evaluating the safety of a robot according to one embodiment of the present invention.
Figure 7:
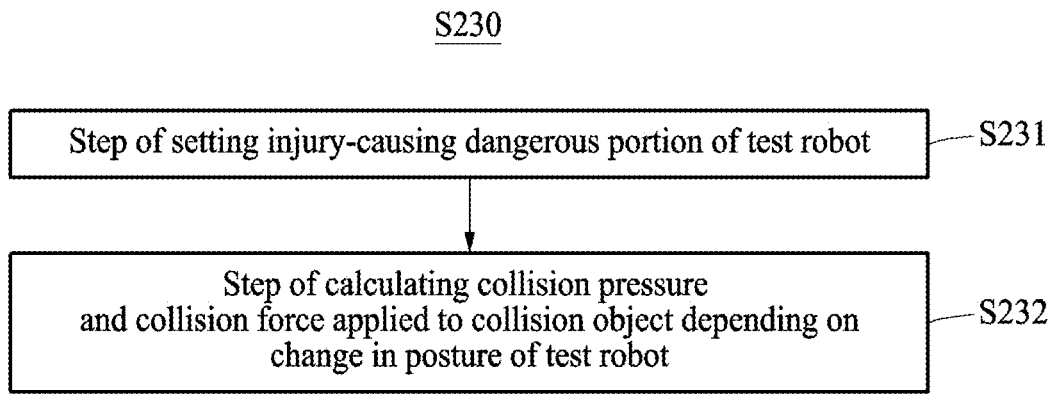
FIG. 7 is a flowchart for explaining the step of calculating a collision pressure and collision force applied to a collision object by a test robot shown in FIG. 6.

FIG. 6 is a flowchart for explaining a method of evaluating the safety of a robot according to one embodiment of the present invention, and FIG. 7 is a flowchart for explaining the step of calculating a collision pressure and collision force applied to a collision object by a test robot shown in FIG. 6.

Referring to FIGS. 3 to 7, method S200 of evaluating the safety of a robot includes step S210 of obtaining the three-dimensional shape of a test robot, step S220 of setting the movement time and movement path of the test robot, step S230 of calculating a collision pressure and collision force applied to a collision object by the test robot, and step S240 of evaluating the safety of the robot.

Step S210 of obtaining the three-dimensional shape of a test robot and step S220 of setting the movement time and movement path of the test robot are already described in FIG. 1, and thus repeated description is omitted.

In step S230 of calculating a collision pressure and collision force applied to a collision object by the test robot, in consideration of the shape, effective mass, movement speed, and direction of the injury-causing dangerous portion of the test robot 10, the collision pressure (P) and collision force ($F_C$) applied to the collision object 20 are calculated.

Specifically, the collision force ($F_C$) applied to the collision object 20 may be implemented through Equation 1 described above. Here, the collision object 20 may be a person, an effective mass ($M_t$) for the collision portion of the test robot may be calculated based on kinematics, and an effective mass ($M_h$) for the collision portion of the collision object may be determined in advance by user input. The displacement of the collision portion ($y_t$) of the test robot and the displacement of the collision portion ($y_h$) of the collision object may be obtained through the CAE system.

In addition, the collision pressure (P) applied to the collision object 20 may be implemented through Equation 2 described above. Here, the skin elasticity (K) and skin thickness (h) of the collision object may be input by a user through the CAE system and stored in advance.

In step S230 of calculating a collision pressure and collision force applied to a collision object by the test robot, a collision pressure (P) and collision force ($F_C$) applied to the collision object 20 for a predetermined time unit may be calculated. Thereby, the amount of data for calculating the collision pressure (P) and collision force ($F_C$) may be reduced to increase the speed of calculation, and overload may be prevented. Here, the predetermined time unit may vary depending on the shape of the test robot 10. That is, as the complexity of the shape of the test robot 10 increases, the predetermined time unit may be shortened.

Step S230 of calculating a collision pressure and collision force applied to a collision object by the test robot may further include step S231 of setting the injury-causing dangerous portion of the test robot.

In step S231 of setting the injury-causing dangerous portion of the test robot, a contact pressure applied to the collision object 20 depending on the area of each portion of the test robot 10 is calculated, and at least one injury-causing dangerous portion is set in the test robot 10 based on the calculated contact pressure value.

For example, when the test robot 10 is formed in a cylindrical shape, the circumferential surface, upper surface, lower surface, upper edge, and lower edge of the test robot 10 may be set as the injury-causing dangerous portion. In addition, a contact pressure applied to the collision object 20 depending on the area of each portion is calculated. Here, the contact pressure may be calculated using an equation of P=F/A (P: pressure, F: force, A: area).

When a contact pressure for each portion of the test robot 10 is calculated through this process, a portion having the greatest contact pressure value or portions having a contact pressure value exceeding a preset value may be selected as the injury-causing dangerous portion.

In addition, a user may select one or more injury-causing dangerous portions in the test robot 10. Specifically, the injury-causing dangerous portion of the test robot 10 may include one or more selected from the linkers 12 and the end-effector 13. When the injury-causing dangerous portion of the test robot 10 is set in advance by a user, step S231 of setting the injury-causing dangerous portion of the test robot may be omitted.

In step S240 of evaluating the safety of the test robot, it is determined whether the magnitudes of the collision pressure (P) and collision force ($F_C$) obtained in step S230 of calculating a collision pressure and collision force applied to a collision object by the test robot fall within the magnitudes of the predetermined maximum collision pressure ($P_{MAX}$) and predetermined maximum collision force ($F_{MAX}$).

In step S240 of evaluating the safety of the robot, when the magnitudes of the collision pressure (P) and collision force ($F_C$) applied to the collision object 20 fall within the magnitudes of the predetermined maximum collision pressure ($P_{MAX}$) and predetermined maximum collision force ($F_{MAX}$), it is determined that the test robot 10 is safe. Conversely, when the magnitudes of the collision pressure (P) and collision force ($F_C$) are greater than or equal to the magnitudes of the maximum collision pressure ($P_{MAX}$) and maximum collision force ($F_{MAX}$), it is determined that the test robot 10 is not safe.

In step S240 of evaluating the safety of the robot, when the magnitudes of the collision pressure (P) and collision force ($F_C$) are greater than or equal to the magnitudes of the maximum collision pressure ($P_{MAX}$) and maximum collision force ($F_{MAX}$), the movement speed of the test robot 10 may be controlled so that the magnitudes of the collision pressure (P) and collision force ($F_C$) applied to the collision object 20 are less than the magnitudes of the maximum collision pressure ($P_{MAX}$) and maximum collision force ($F_{MAX}$). That is, when the movement speed of the test robot 10 is reduced, force applied to the collision object 20 is reduced. As a result, pressure is also reduced. Thus, when the movement speed of the test robot 10 is properly controlled, the robot R that does not injure a person while moving at the maximum speed may be implemented.

In step S240 of evaluating the safety of the robot, the magnitudes of the predetermined maximum collision pressure ($P_{MAX}$) and predetermined maximum collision force ($F_{MAX}$) may be determined in accordance with the International Organization for Standardization (ISO), specifically the TS 15066 standard. In TS 15066 of the International Organization for Standardization (ISO), the maximum permissible pressure and maximum permissible force for each part of the human body are specified. Based thereon, when the magnitudes of the maximum collision pressure ($P_{MAX}$)

and maximum collision force ($F_{MAX}$) are set, the safety of the robot R may be further improved.

In addition, step S230 of calculating a collision pressure and collision force applied to a collision object by the test robot may further include step S232 of calculating a collision pressure and collision force applied to the collision object depending on change in the posture of the test robot.

In step S232 of calculating a collision pressure and collision force applied to the collision object depending on change in the posture of the test robot, the postures of the linkers 12 and end-effector 13 are changed by adjusting the angle of the joint 11 of the test robot 10, and the collision pressure (P) and collision force ($F_C$) applied to the collision object 20 by the injury-causing dangerous portion depending on changes in the postures are calculated.

The reason for calculating the collision pressure (P) and collision force ($F_C$) applied to the collision object 20 while changing the posture of the test robot 10 is that a distance and contact portion between the collision object 20 and the test robot 10 vary depending on changes in the postures of the linkers 12 and the end-effector 13, and as a result, the magnitudes of the collision pressure (P) and collision force ($F_C$) applied to the collision object 20 vary.

Accordingly, when the magnitudes of the collision pressure (P) and collision force ($F_C$) applied to the collision object 20 depending on changes in the postures are obtained, a posture that minimizes impact on the collision object 20 may be implemented even when the robot R moves along the same movement path at the same movement speed.

As described above, according to the method of evaluating the safety of a robot, the magnitudes of a collision pressure and collision force applied to a collision object by a test robot may be obtained through simulation. The test robot is formed of a three-dimensional model robot or three-dimensional image robot having a shape and driving motion similar to those of a real robot. Accordingly, there is no need for separate devices to measure the collision pressure, collision force, and movement speed of the real robot. Thus, safety evaluation may be performed at low cost.

In addition, a contact pressure applied to the collision object depending on the area of each portion of the test robot is calculated, and an injury-causing dangerous portion is selected. Then, a collision pressure and collision force applied to the collision object by the selected injury-causing dangerous portion are calculated. Thus, a collision pressure and collision force corresponding to the shape of the test robot may be obtained. That is, conventionally, regardless of the shape of a robot, a contact pressure is constantly applied to calculate a collision pressure and collision force applied to a collision object. Thus, the accuracy of the calculated values is low. However, as described in the present invention, when a contact pressure applied to a collision object depending on the shape of each part of a test robot is calculated, and an injury-causing dangerous portion is selected based on the calculated value, a collision pressure and collision force corresponding to the shape of the collision portion of the test robot may be obtained, thereby improving accuracy.

In addition, since a collision pressure and collision force are calculated while changing the postures of a test robot, a posture that minimizes impact on a collision object may be implemented. Accordingly, when the test robot moves while taking the implemented posture, the test robot may move at the maximum speed while moving along the same movement path.

Figure 8:
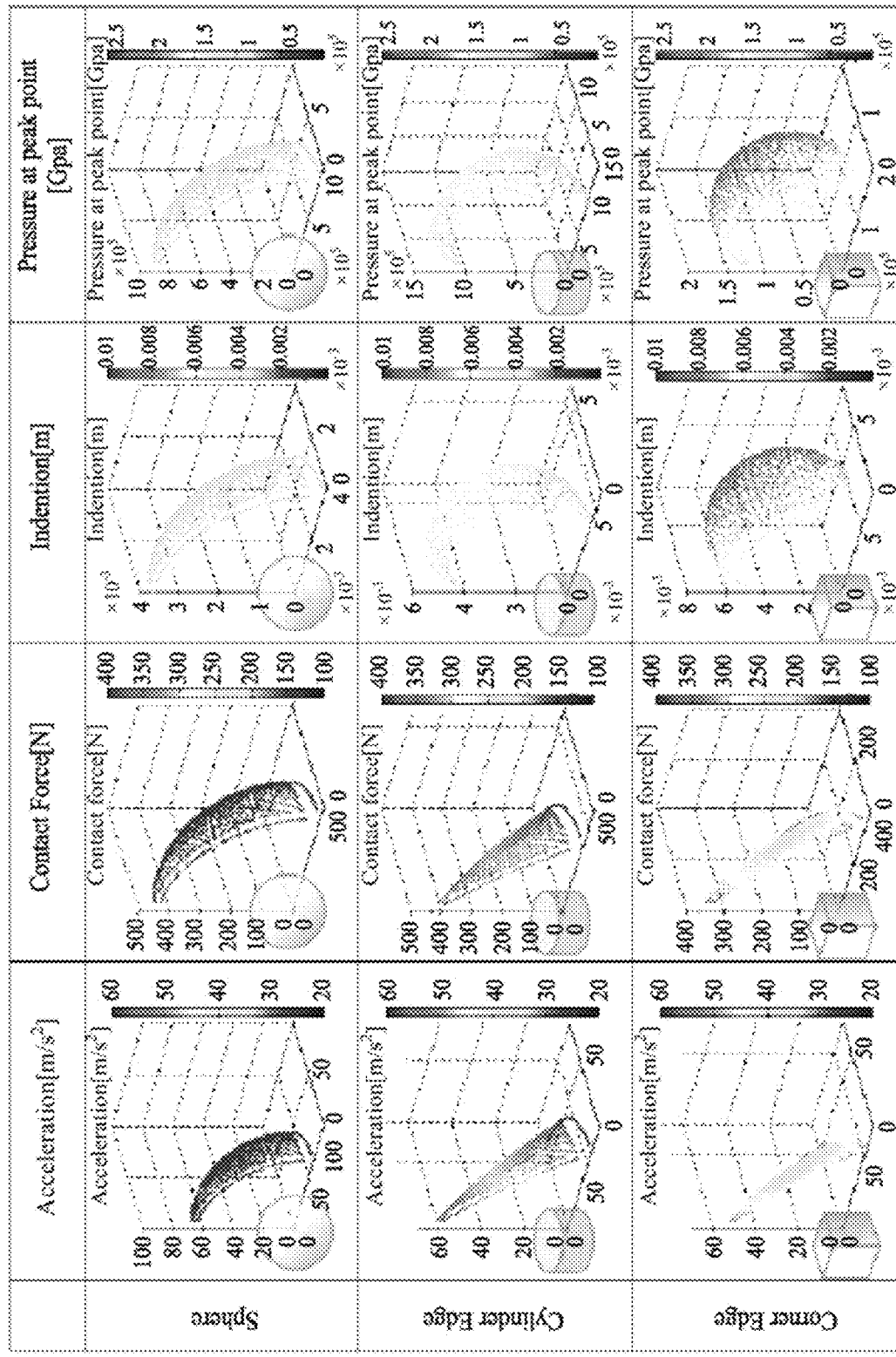
FIG. 8 is a diagram showing the magnitude of a contact pressure applied to a collision object depending on the shape of each part of a test robot.
Figure 9:
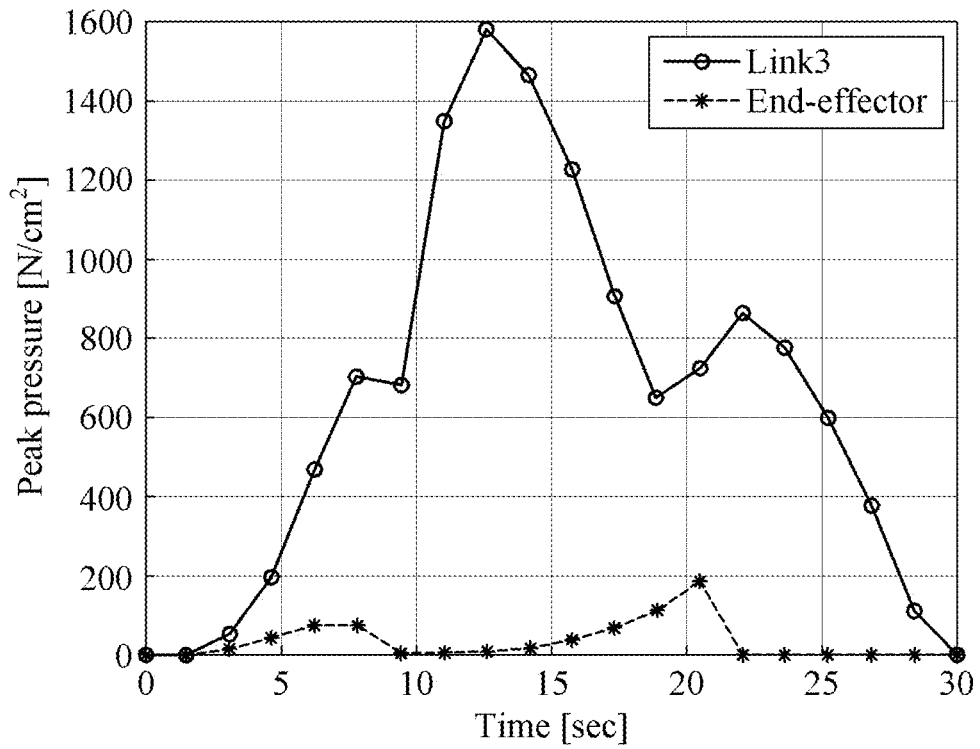
FIG. 9 includes graphs showing collision pressure values and collision force values obtained through a 3D modeling program.
Figure 9:
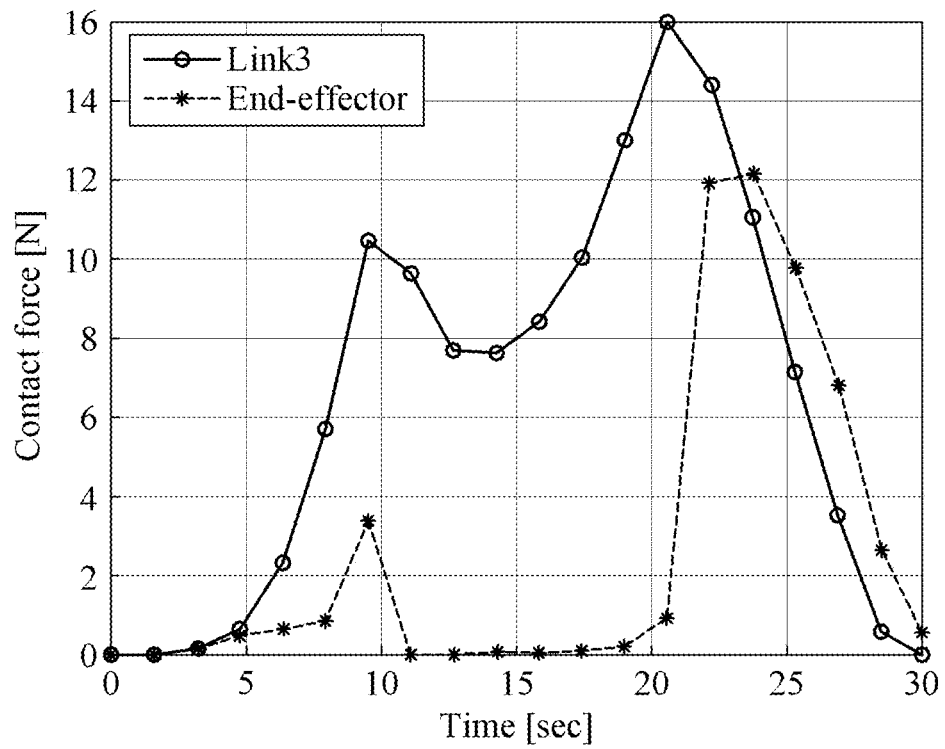

FIG. 8 is a diagram showing the magnitude of a contact pressure applied to a collision object depending on the shape of each part of a test robot, and FIG. 9 includes graphs showing collision pressure values and collision force values obtained through a 3D modeling program.

Referring to FIGS. 1 to 9, a method of improving the safety of a robot and a method of evaluating the safety of a robot are described as follows.

First, a user inputs the shape information of the real robot R into a simulation program to obtain the three-dimensional image of a test robot, or obtains the three-dimensional model of the test robot through a three-dimensional measurement sensor. Here, the test robot 10 may be a manipulator capable of moving in one of the X-axis direction, the Y-axis direction, the Z-axis direction, the pitch direction, the yaw direction, and the roll direction. That is, the test robot 10 may be a manipulator having at least one degree of freedom.

Then, profile information including movement time information and movement path information is input into a simulation program or a test robot system to set the movement time and movement path of the test robot 10. Accordingly, a simulation in which the test robot 10 moves along a predetermined movement path for a predetermined time is performed.

Then, a contact pressure applied to the collision object 20 depending on the shape of each portion of the test robot 10 is calculated, and at least one injury-causing dangerous portion is set in the test robot 10 based on the calculated contact pressure value. As shown in FIG. 8, the magnitude of the contact pressure applied to the collision object 20 varies depending on the shape of each part of the test robot.

Here, a portion having the greatest contact pressure value among calculated contact pressure values or portions having a contact pressure value exceeding a preset value may be selected as the injury-causing dangerous portion. In this embodiment, the end-effector 13 and the linkers 12 are set as the injury-causing dangerous portions.

When the injury-causing dangerous portion of the test robot 10 is set in this way, in consideration of the effective mass, movement speed, and direction of the injury-causing dangerous portion of the test robot 10, a collision pressure (P) and collision force ($F_C$) applied to the collision object 20 are calculated. Here, the values of the collision pressure (P) and collision force ($F_C$) applied to the collision object 20 by the end-effector 13 and linkers 12, which are injury-causing dangerous portions, are shown in FIG. 9. Since the method of calculating the collision pressure (P) and collision force ($F_C$) has been described above, description thereof will be omitted.

When the magnitudes of the collision pressure (P) and collision force ($F_C$) are determined in this way, it is determined whether the magnitudes of the collision pressure (P) and collision force ($F_C$) fall within the magnitudes of a predetermined maximum collision pressure ($P_{MAX}$) and predetermined maximum collision force ($F_{MAX}$). That is, when the magnitudes of the collision pressure (P) and collision force ($F_C$) fall within the magnitudes of the predetermined maximum collision pressure ($P_{MAX}$) and predetermined maximum collision force ($F_{MAX}$), it is determined that the robot R is safe. Conversely, when the magnitudes of the collision pressure (P) and collision force ($F_C$) are greater than or equal to the magnitudes of the maximum collision pressure ($P_{MAX}$) and maximum collision force ($F_{MAX}$), it is determined that the robot R is not safe. Here, the magnitudes of the predetermined maximum collision pressure ($P_{MAX}$) and predetermined maximum collision force ($F_{MAX}$) may be determined in accordance with the standards of the International Organization for Standardization (ISO).

Figure 10:
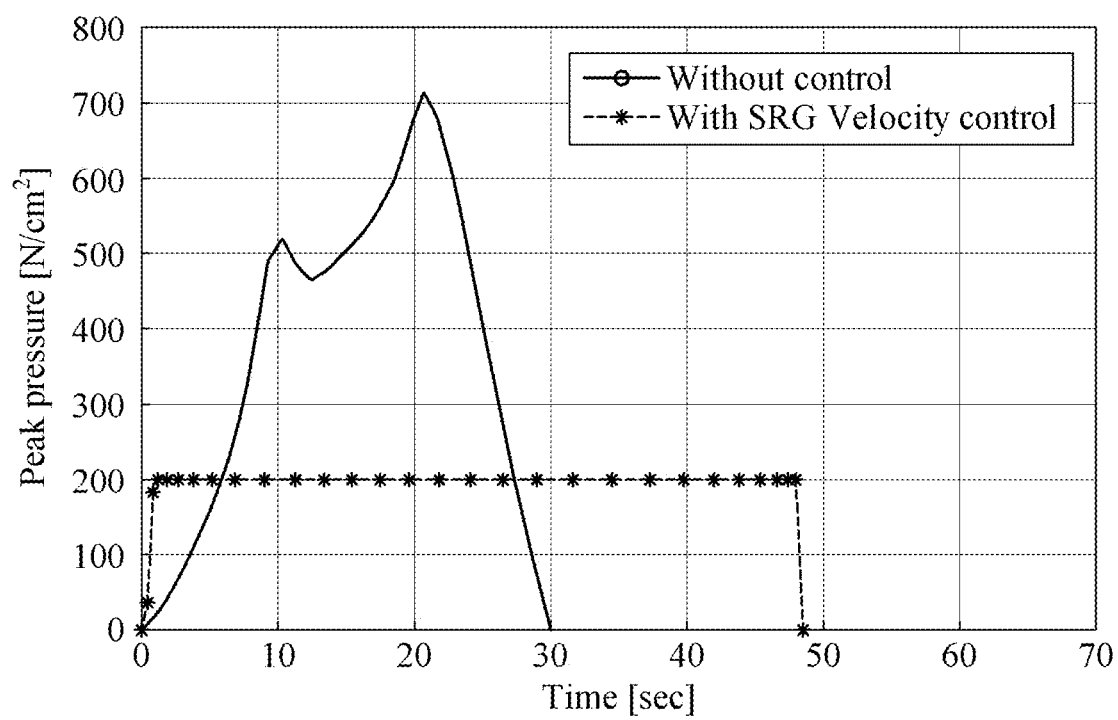
FIG. 10 is a graph for explaining the control state of a robot that maximizes productivity and safety through speed control.
Figure 11:
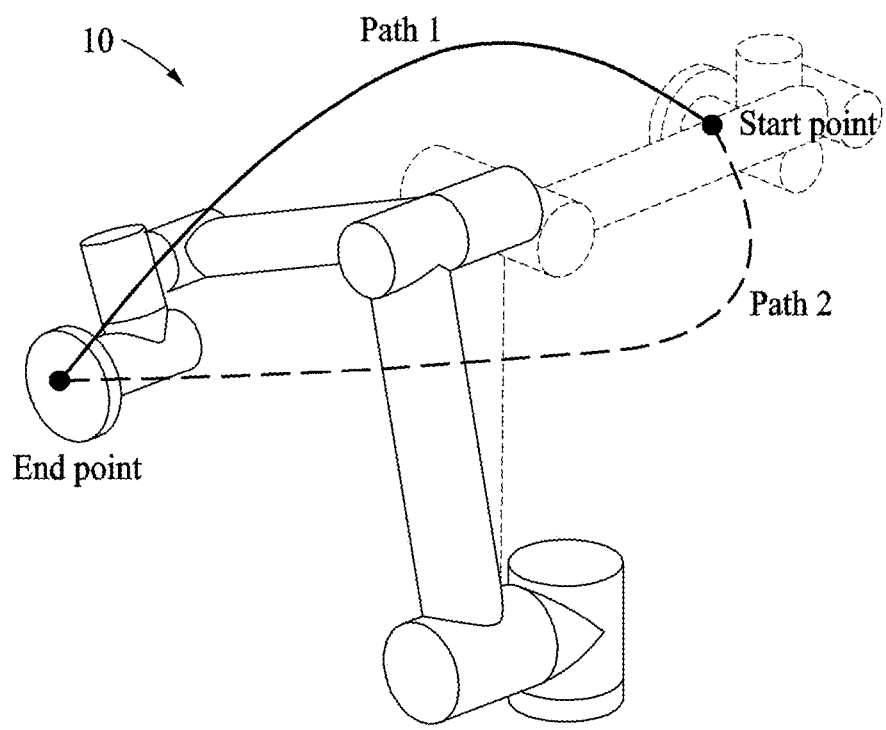
FIG. 11 is a drawing showing a state in which a path is modified by setting a joint angle to maximize safety.

FIG. 10 is a graph for explaining the control state of a robot that maximizes productivity and safety through speed control, and FIG. 11 is a drawing showing a state in which a path is modified by setting a joint angle to maximize safety.

Referring to FIGS. 1 to 11, a method of improving the safety of a robot is described as follows.

When it is determined that the robot R is not safe, as shown in FIG. 11, the joint angle of the test robot 10 is adjusted to change the postures of the linkers 12 and end-effector 13 so that the magnitudes of the collision pressure (P) and collision force ($F_C$) of the test robot 10 fall within the magnitudes of a predetermined maximum collision pressure ($P_{MAX}$) and predetermined maximum collision force ($F_{MAX}$).

When it is determined that the robot R is safe, the maximum speed of the test robot 10 at which the magnitudes of the collision pressure (P) and collision force ($F_C$) of the test robot 10 fall within the magnitudes of the predetermined maximum collision pressure ($P_{MAX}$) and predetermined maximum collision force ($F_{MAX}$) is calculated, and the calculated maximum speed is re-entered into profile information to control the speed of the test robot 10.

The present invention has been described with reference to one embodiment shown in the accompanying drawings, but this is only exemplary, and those skilled in the art can understand that various modifications and other equivalent embodiments are possible. Therefore, the true protection scope of the present invention should be defined only by the appended claims.

The invention claimed is:

1. A method of improving safety of a robot, comprising:
a step of obtaining a three-dimensional image or a three-dimensional model of a test robot comprising shape information of a real robot;
a step of setting a movement time and a movement path of the test robot by inputting profile information comprising movement time information and movement path information of the test robot;
a step of evaluating safety of the robot by obtaining, at every predetermined time, a collision pressure and a collision force applied to a collision object in consideration of a shape, effective mass, movement speed, and direction of an injury-causing dangerous portion among a plurality of portions of the test robot, and by determining whether magnitudes of the collision pressure and the collision force obtained at every predetermined time fall within magnitudes of a predetermined maximum collision pressure and a predetermined maximum collision force;
a step of, when the magnitudes of the collision pressure and the collision force are greater than the magnitudes of the predetermined maximum collision pressure and the predetermined maximum collision force, calculating a maximum speed at which the magnitudes of the collision pressure and the collision force satisfy the magnitudes of the predetermined maximum collision pressure and the predetermined maximum collision force; and
a step of resetting the movement time and the movement path of the test robot by modifying the profile information so that the test robot moves at the calculated maximum speed,
wherein the step of evaluating safety of the robot comprises:
calculating collision pressures and collision forces applied to the collision object by the injury-causing dangerous portion among the plurality of portions of the test robot while changing a posture of the test robot, selecting a minimum collision pressure applied to the collision object among the calculated collision pressures and a minimum collision force applied to the collision object among the calculated collision forces and storing the selected minimum collision pressure and the selected minimum collision force, and
moving the test robot while changing, at every predetermined time, a joint angle of the test robot to an angle corresponding to the stored minimum collision pressure and the stored minimum collision force.

2. The method according to claim 1, wherein the test robot is a three-dimensional model formed through a three-dimensional image or a three-dimensional measurement sensor formed by inputting shape information of the robot into a simulation program.

3. The method according to claim 2, wherein the simulation program is a computer-aided engineering (CAE) program.

4. The method according to claim 1, wherein the magnitudes of the maximum collision pressure and the maximum collision force are determined in accordance with standards of the International Organization for Standardization (ISO).

5. The method according to claim 1, wherein the test robot is a manipulator having at least one degree of freedom.

6. The method according to claim 1, wherein the test robot comprises two or more linkers connected through a joint and an end-effector connected to one of the linkers, and the injury-causing dangerous portion comprises one or more selected from the linkers and the end-effector.

7. The method according to claim 6, wherein the step of evaluating safety of the robot further comprises a step of adjusting a joint angle of the test robot to change postures of the linkers and the end-effector.

8. The method according to claim 1, wherein the step of evaluating safety of the robot further comprises a step of calculating a contact pressure applied to the collision object depending on a shape of each portion among the plurality of portions of the test robot, and setting the injury-causing dangerous portion in the test robot based on the calculated contact pressure value.

9. The method according to claim 1, wherein the collision pressure applied to the collision object is calculated based on:
(i) degree of deformation of skin of the collision object and the test robot,
(ii) skin elasticity of the collision object and the test robot, and
(iii) a skin thickness of the collision object and the test robot,
wherein the collision force applied to the collision object is calculated based on:
(i) effective mass for the injury-causing dangerous portion of the test robot,
(ii) effective mass for a collision portion of the collision object,
(iii) displacement and speed of the injury-causing dangerous portion of the test robot, and
(iv) skin elasticity of the injury-causing dangerous portion of the test robot,
(v) collision pressure for a collision portion of the collision object,
(vi) collision area for a collision portion of the collision object,
(vii) displacement and speed of the collision portion of the collision object, and (viii) a collision angle between the test robot and the collision object, and wherein the collision object is a person.

10. A method of improving safety of a manipulator, comprising:

a step of obtaining a three-dimensional image or a three-dimensional model of a test manipulator comprising shape information of a real manipulator and having at least one degree of freedom;

a step of setting a movement time and a movement path of the test manipulator by inputting profile information comprising movement time information and movement path information of the test manipulator;

a step of calculating a contact pressure applied to a collision object depending on a shape of each portion among a plurality of portions of the test manipulator, and setting at least one injury-causing dangerous portion among the plurality of portions in the test manipulator based on the calculated contact pressure value;

a step of evaluating safety of the manipulator by obtaining, at every predetermined time, a collision pressure and collision force applied to the collision object in consideration of an effective mass, movement speed, and direction of the injury-causing dangerous portion among the plurality of portions of the test manipulator, and by determining whether magnitudes of the collision pressure and the collision force fall within magnitudes of a predetermined maximum collision pressure and a predetermined maximum collision force;

a step of, when the magnitudes of the collision pressure and the collision force are greater than the magnitudes of the predetermined maximum collision pressure and the predetermined maximum collision force, calculating a maximum speed for each movement direction at which the magnitudes of the collision pressure and the collision force fall within the magnitudes of the maximum collision pressure and the maximum collision force; and a step of resetting the movement time and the movement path of the test manipulator by modifying the profile information so that the test manipulator moves at the calculated maximum speed, wherein the step of evaluating safety of the manipulator comprises:

calculating collision pressures and collision forces applied to the collision object by the injury-causing dangerous portion among the plurality of portions of the test manipulator while changing a posture of the test manipulator, selecting a minimum collision pressure applied to the collision object among the calculated collision pressures and a minimum collision force applied to the collision object among the calculated collision forces and storing the selected minimum collision pressure and the selected minimum collision force, and moving the test manipulator while changing, at every predetermined time, a joint angle of the test manipulator to an angle corresponding to the minimum collision pressure and the minimum collision force.

11. The method according to claim 10, wherein the test manipulator is a three-dimensional model formed through a three-dimensional image or a three-dimensional measurement sensor formed by inputting shape information of the manipulator into a simulation program.

12. The method according to claim 11, wherein the simulation program is a computer-aided engineering (CAE) program.

13. The method according to claim 10, wherein the magnitudes of the predetermined maximum collision pressure and the predetermined maximum collision force are determined in accordance with standards of the International Organization for Standardization (ISO).

14. The method according to claim 10, wherein the test manipulator comprises two or more linkers connected through a joint and an end-effector connected to one of the linkers, and the injury-causing dangerous portion comprises one or more selected from the linkers and the end-effector.

15. The method according to claim 14, wherein the step of evaluating safety of the manipulator further comprises a step of adjusting a joint angle of the test manipulator to change postures of the linkers and the end-effector.

16. The method according to claim 10, wherein the collision pressure applied to the collision object is calculated based on:

(i) degree of deformation of skin of the collision object and the test manipulator, (ii) skin elasticity of the collision object and the test manipulator, and (iii) a skin thickness of the collision object and the test manipulator, wherein the collision force applied to the collision object is calculated based on:

(i) effective mass for the injury-causing dangerous portion of the test manipulator, (ii) effective mass for a collision portion of the collision object, (iii) displacement and speed of the injury-causing dangerous portion of the test manipulator, (iv) skin elasticity of the injury-causing dangerous portion of the test manipulator, (v) collision pressure for a collision portion of the collision object, (vi) collision area for a collision portion of the collision object, (vii) displacement and speed of the collision portion of the collision object, and (viii) a collision angle between the test manipulator and the collision object, and wherein the collision object is a person.

17. A method of evaluating safety of a robot, comprising:

a step of obtaining a three-dimensional image or a three-dimensional model of a test robot comprising shape information of a real robot;

a step of setting a movement time and a movement path of the test robot by inputting profile information comprising movement time information and movement path information of the test robot; and a step of evaluating safety of the robot by calculating a collision pressure and a collision force applied to a collision object in consideration of a shape, effective mass, movement speed, and direction of an injury-causing dangerous portion among a plurality of portions of the test robot, and by determining whether magnitudes of the calculated collision pressure and the calculated collision force fall within magnitudes of a predetermined maximum collision pressure and a predetermined maximum collision force, wherein the step of evaluating safety of the robot comprises:

calculating collision pressures and collision forces applied to the collision object by the injury-causing dangerous portion among the plurality of portions of the test robot while changing a posture of the test robot, selecting a minimum collision pressure applied to the collision object among the calculated collision pressures and a minimum collision force applied to the collision object among the calculated collision forces and storing the selected minimum collision pressure and the selected minimum collision force, and moving the test robot while changing, at every predetermined time, a joint angle of the test robot to an angle corresponding to the minimum collision pressure and the minimum collision force.

18. The method according to claim 17, wherein the test robot is a three-dimensional model formed through a three-dimensional image or a three-dimensional measurement sensor formed by inputting shape information of the robot into a simulation program.

19. The method according to claim 18, wherein the simulation program is a computer-aided engineering (CAE) program.

20. The method according to claim 17, wherein, when the magnitudes of the collision pressure and the collision force are greater than or equal to the magnitudes of the predetermined maximum collision pressure and the predetermined maximum collision force, a speed of the test robot is controlled so that the collision pressure and the collision force applied to the collision object are less than the magnitudes of the predetermined maximum collision pressure and the predetermined maximum collision force.

21. The method according to claim 17, wherein the magnitudes of the predetermined maximum collision pressure and the predetermined maximum collision force are determined in accordance with standards of the International Organization for Standardization (ISO).

22. The method according to claim 17, wherein the test robot is a manipulator having at least one degree of freedom.

23. The method according to claim 17, wherein the collision pressure applied to the collision object is calculated based on:

(i) degree of deformation of skin of the collision object and the test robot, (ii) skin elasticity of the collision object and the test robot, and (iii) a skin thickness of the collision object and the test robot, wherein the collision force applied to the collision object is calculated based on:

(i) effective mass for the injury-causing dangerous portion of the test robot, (ii) effective mass for a collision portion of the collision object, (iii) displacement and speed of the injury-causing dangerous portion of the test robot, and (iv) skin elasticity of the injury-causing dangerous portion of the test robot, (v) collision pressure for a collision portion of the collision object, (vi) collision area for a collision portion of the collision object, (vii) displacement and speed of the collision portion of the collision object, and (viii) a collision angle between the test robot and the collision object, and wherein the collision object is a person.

* * * * *